US011719849B2

United States Patent
Zhang et al.

(10) Patent No.: US 11,719,849 B2
(45) Date of Patent: Aug. 8, 2023

(54) MODELING TEXTURAL PARAMETERS OF A FORMATION WITH DOWNHOLE MEASUREMENTS

(71) Applicant: Baker Hughes Holdings LLC, Houston, TX (US)

(72) Inventors: Yinxi Zhang, Houston, TX (US); Sushant Dutta, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 579 days.

(21) Appl. No.: 16/169,393

(22) Filed: Oct. 24, 2018

(65) Prior Publication Data
US 2020/0132875 A1    Apr. 30, 2020

(51) Int. Cl.
*G01V 3/32* (2006.01)
*G01V 99/00* (2009.01)
(Continued)

(52) U.S. Cl.
CPC .............. *G01V 3/32* (2013.01); *E21B 47/003* (2020.05); *E21B 49/00* (2013.01); *E21B 49/087* (2013.01);
(Continued)

(58) Field of Classification Search
CPC .......... G01V 3/32; G01V 3/38; G01V 99/005; G06N 20/00; E21B 47/003; E21B 49/00
See application file for complete search history.

(56) References Cited

U.S. PATENT DOCUMENTS 7,376,514 B2 *  5/2008  Habashy ................. G01V 3/30
                                                                 702/7
2006/0173625 A1   8/2006  Moran
(Continued)

FOREIGN PATENT DOCUMENTS

WO    2016167771 A1    10/2016

OTHER PUBLICATIONS

International Search Report and Written Opinion dated Jan. 13, 2020 in International Patent Application No. PCT/US19/57637.
(Continued)

*Primary Examiner* — Alexander Satanovsky
*Assistant Examiner* — Lynda Dinh
(74) *Attorney, Agent, or Firm* — Hogan Lovells US LLP

(57) ABSTRACT

A method includes obtaining a dielectric measurement of a portion of a downhole formation. The method also includes processing the dielectric measurement via a trained machine learning system. The method further includes determining at least one of a classification or a textural parameter simultaneously with formation water saturation of the downhole formation, via the machine learning system, based at least in part on the dielectric measurement. The machine learning system is based on a pre-determined dataset from previous measurements or simulated results of synthetic cases. The method determining the correlation between water saturation and formation texture through a frequency cascading training process based on sensitivity of complex dielectric spectrum with respect to desired parameters including water saturation and texture parameter. The method also includes assigning at least one of the classification or the textural parameter to the downhole formation.

4 Claims, 15 Drawing Sheets

(51) Int. Cl.
  *G06N 20/00* (2019.01)
  *E21B 47/00* (2012.01)
  *E21B 49/00* (2006.01)
  *E21B 49/08* (2006.01)
  *E21B 47/003* (2012.01)
  *G01V 3/38* (2006.01)

(52) U.S. Cl.
  CPC .............. *G01V 3/38* (2013.01); *G01V 99/005* (2013.01); *G06N 20/00* (2019.01)

(56) References Cited

U.S. PATENT DOCUMENTS

| | | | |
|---|---|---|---|
| 2015/0330216 A1* | 11/2015 | Kouchmeshky | E21B 47/13 324/338 |
| 2016/0097876 A1* | 4/2016 | Freed | G01V 3/24 703/2 |
| 2017/0030819 A1* | 2/2017 | McCarty | C09K 8/605 |
| 2017/0123104 A1* | 5/2017 | Donadille | G01V 3/06 |
| 2018/0058211 A1* | 3/2018 | Liang | G01V 1/282 |
| 2018/0059280 A1* | 3/2018 | Hartmann | G01V 3/30 |
| 2018/0164466 A1* | 6/2018 | Zhang | G01V 3/28 |
| 2020/0034711 A1* | 1/2020 | Misra | G06F 16/285 |

OTHER PUBLICATIONS

GCC Examination and Search Report dated Nov. 15, 2020 in corresponding GCC Patent Application No. GC 2019-38487.

* cited by examiner

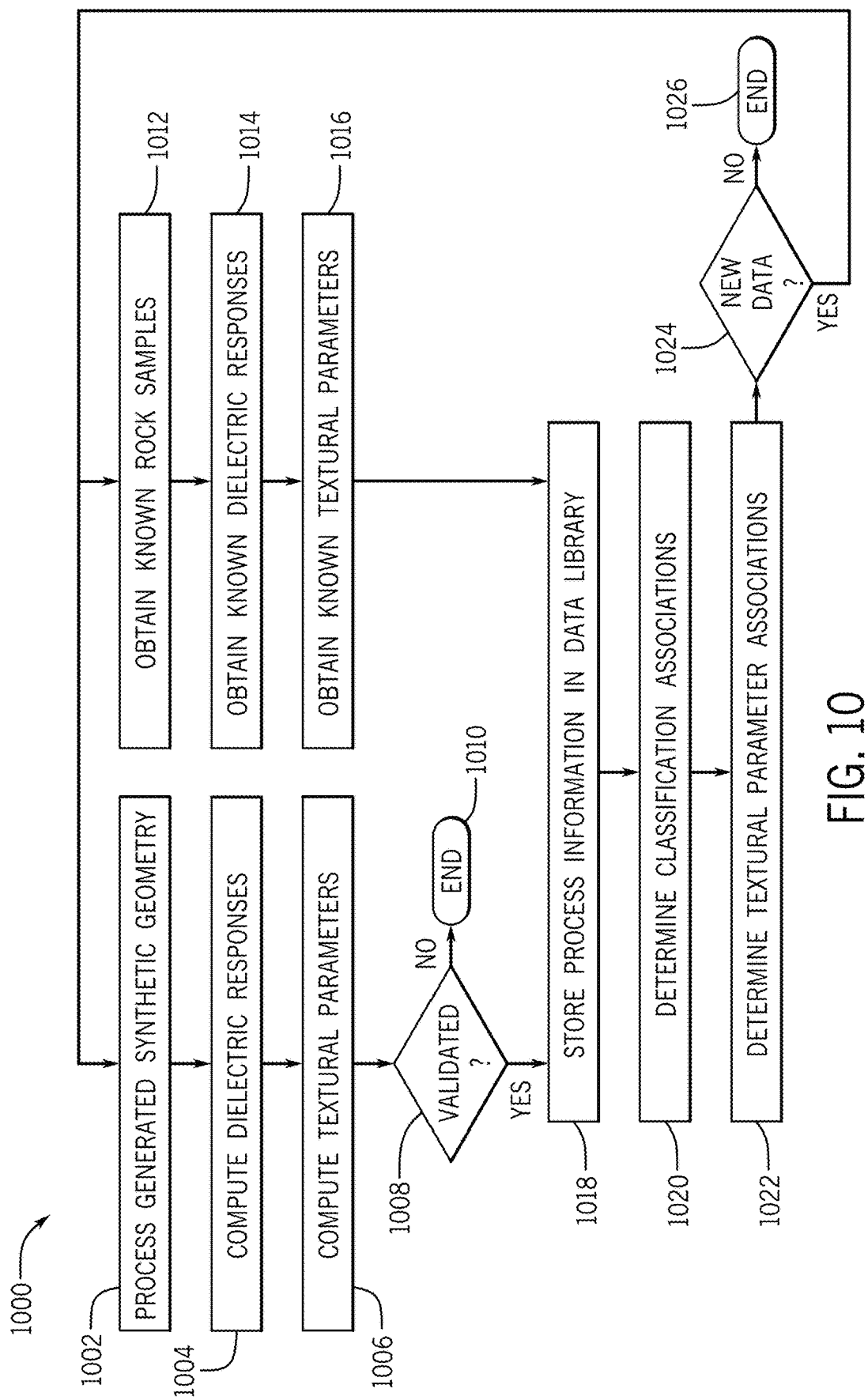

MODELING TEXTURAL PARAMETERS OF A FORMATION WITH DOWNHOLE MEASUREMENTS

BACKGROUND

1. Field of the Invention

The present disclosure relates to wellbore characterization. More specifically, this application relates to identifying formation properties using shallow downhole measurements.

2. Description of Related Art

During oil and gas operations, various measurements may be acquired downhole in order to evaluate one or more formation properties. The measurements may be referred to as "shallow" measurements as they evaluate near-borehole zones and rarely penetrate deeper into the formation. As a result, formation properties for deep zones and rock textures are typically evaluated using core samples extracted from a wellbore rather than the shallow measurements. Obtaining core samples is expensive and time consuming. Moreover, evaluations of the samples may occupy long periods of time. Typically, the wellbore is unproductive when the samples are evaluated, thereby increasing costs.

SUMMARY

Applicant recognized the problems noted above herein and conceived and developed embodiments of systems and methods, according to the present disclosure, for determination of downhole formation properties.

In an embodiment, a method includes obtaining a dielectric measurement of a downhole formation. The method also includes processing the dielectric measurement via a trained machine learning system. The method further includes determining water saturation and at least one classification or textural parameter of the downhole formation, via the machine learning system, based at least in part on the dielectric measurement. The method also includes assigning at least one of the classification or the textural parameter to the downhole formation.

In an embodiment, a computing device includes a microprocessor and memory including instructions that, when executed by the microprocessor, cause the computing device to generate a synthetic rock geometry, the synthetic rock geometry including at least one estimated parameter of a downhole formation. The instructions also cause the computing device to compute a textural parameter of the synthetic rock geometry. The instructions further cause the computing device to simulate a dielectric response of the synthetic rock geometry, based at least in part on the at least one estimated parameter. The instructions also cause the computing device to determine a correspondence between at least one of the textural parameter or the dielectric response and the synthetic rock geometry.

In an embodiment, a system for conducting measurement operations includes a dielectric measurement device, a microprocessor, and memory. The dielectric measurement device forms at least a portion of a downhole tool string and is operable to generate measurement data for detecting a dielectric property of a formation. The memory includes instructions that, when executed by the microprocessor, cause the system to receive the measurement data, process the measurement data, via a trained machine learning system determine a classification of the formation, via the trained machine learning system, the classification being related to a likelihood of recoverability based on one or more textural properties of the formation, and assign the classification to the downhole formation.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 10 is a flow chart of an embodiment of a method for training a machine learning system, in accordance with embodiments of the present disclosure.

DETAILED DESCRIPTION

Figure 1:
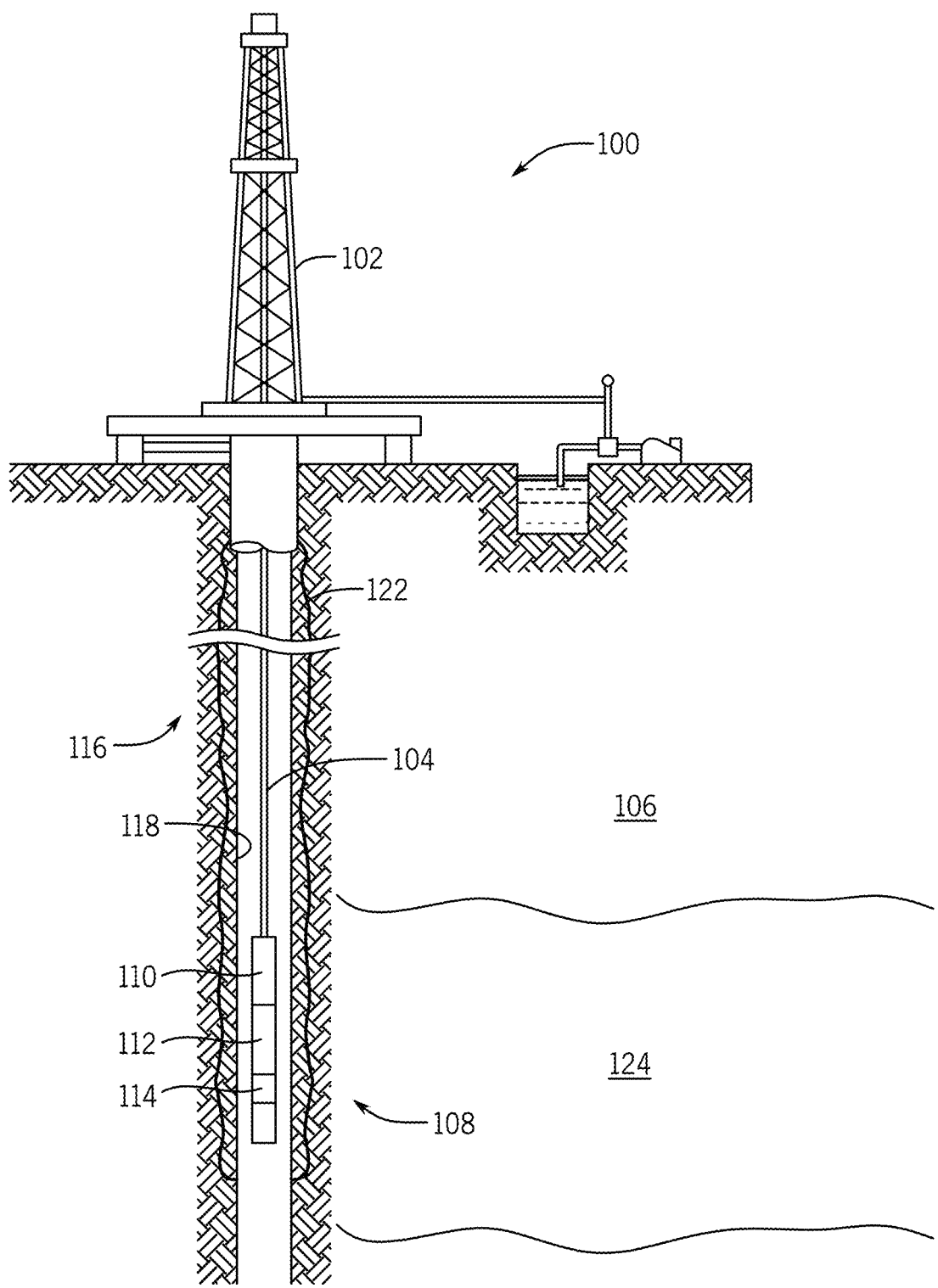
FIG. 1 is a schematic side view of an embodiment of a drilling system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Log analysts face the challenge of identifying true non-invaded formation properties from shallow downhole measurements like dielectric or nuclear magnetic resonance (NMR) logging tools. While flushed fluid causes electrical measurements in the near-borehole zone to differ from deep zone, rock texture usually stays the same. Therefore, geoscientists are especially interested in texture parameters; the simplest and most commonly used ones are Archie's m and n, representing tortuosity and wettability. Embodiments of the present disclosure present a model that directly relates macroscopic textural parameters like m and n, as well as water saturation and other components, to complex permittivity dispersion. Applying the model to invert downhole multi-frequency dielectric data deduces parameters like water saturation, m and n of uninvaded zones without performing resource-consuming core measurements. Moreover, the model is based on microscopic matrix geometry to quantify impacts of complicated formation fabrication. Thus, inversion outcomes from dielectric logs can be extended to textural information like grain size distribution or grain sphericity. As a result, researchers are able to build up rock characterization or pseudo geomechanical models directly from downhole measurements.

In various embodiments, the system applies machine learning to dielectric petrophysics. Utilizing the strong computing power of modern computers and matured finite element method (FEM) electromagnetic software, complex permittivity spectra of a large number of various pore-scale grain rock structures can be computed. Machine learning regression and classification estimators are tested to generate the prediction model from microscopic rock geometry to complex dielectric dispersion. The machine learning approach is data-driven; it helps eliminate complex math derivation, and focuses the study on dielectric petrophysical interpretation. In the meantime, the database created for model development is adaptive to future dielectric logs and core measurements.

Embodiments of the present disclosure include systems and methods for identifying textural properties of a wellbore based on one or more downhole measurements. In various embodiments, dielectric measurements may be input into a trained neural network to determine a classification of the formation along with various textural parameters, such as grain size, connectivity, pore size, and the like. The machine learning system may include a regression module that correlates information from core samples to associated dielectric measurements, and as a result, develops a model to predict textural properties based on dielectric measurements. Furthermore, in embodiments, the machine learning system includes a classification module that classifies formations based on pre-determined criteria, such as pore connectivity, wettability, or the like. In this manner, physical actions at the well site may be informed by machine learning techniques.

In various embodiments, the machine learning system is trained using training data from previously analyzed core samples and their associated dielectric measurements. Moreover, in embodiments, output from the machine learning system may be used for training upon verification. Accordingly, the machine learning system may be continuously updated to provide improved results.

FIG. 1 is a schematic side view of an embodiment of a wellbore system 100 including a rig 102 and a drill string 104 extending into a downhole formation 106. It should be appreciated that while various embodiments may be discussed with reference to the illustrated wellbore system 100, other embodiments may include other wellbore systems that may include wirelines, coiled tubing, and the like. Accordingly, discussion with reference to drill strings 104 is for illustrative purposes only. The illustrated drill string 104 is formed from a plurality of tubulars joined together, for example via threads, and extends into the formation 106 to a bottom hole assembly (BHA) 108. In the illustrated embodiment, the BHA 108 includes a plurality of measurement modules, such as a core sampling unit 110, a dielectric measurement unit 112, and a nuclear measurement unit 114. In various embodiments, the BHA 108 may include additional or fewer units, and further, may be utilized to conduct one or more downhole measurement operations. Additionally, it should be appreciated that the drill string 104 may include various other components, which have been removed for simplicity and clarification with the discussion herein. Furthermore, while embodiments may be discussed with reference to drilling operations, in other embodiments the measurements may be conducted during logging periods, intervention periods, and the like.

As illustrated in FIG. 1, in various embodiments a wellbore 116 extends into the formation 106 and includes a borehole sidewall 118 and an annulus 120 arranged between the BHA 108 and the sidewall 118. In certain embodiments, during formation of the wellbore 116, the drill string 104 may include a drill bit that is driven to rotate. In various embodiments, fluid such as drilling mud may be pumped through the drill string 104 and through the drill bit, where the drilling mud may infiltrate the formation 106 in a near-borehole zone 122. Accordingly, as will be described below, measurements obtained from various systems, such as the systems illustrated with the BHA 108, may be inaccurate because of the infiltration.

In various embodiments, the BHA 108 may be utilized to determine the location of a recoverable zone 124 within the formation 106. The recoverable zone 124 may refer to a region of the formation 106 that includes recoverable hydrocarbons. Whether or not the hydrocarbons are recoverable may be determined, at least in part, by one or more formation properties. In various embodiments, the formation properties refer to texture parameters of the geological structures that form the formation 106 at or near the recoverable zone 124. Texture parameters (e.g., textural parameters) may refer to pore size, pore radius, pore locations, pore connectivity, porosity, wettability, and the like. As will be described below, embodiments of the present disclosure may enable a determination of texture parameters for the formation 106 to therefore inform decisions regarding future recovery or wellbore intervention activities.

Figure 2:
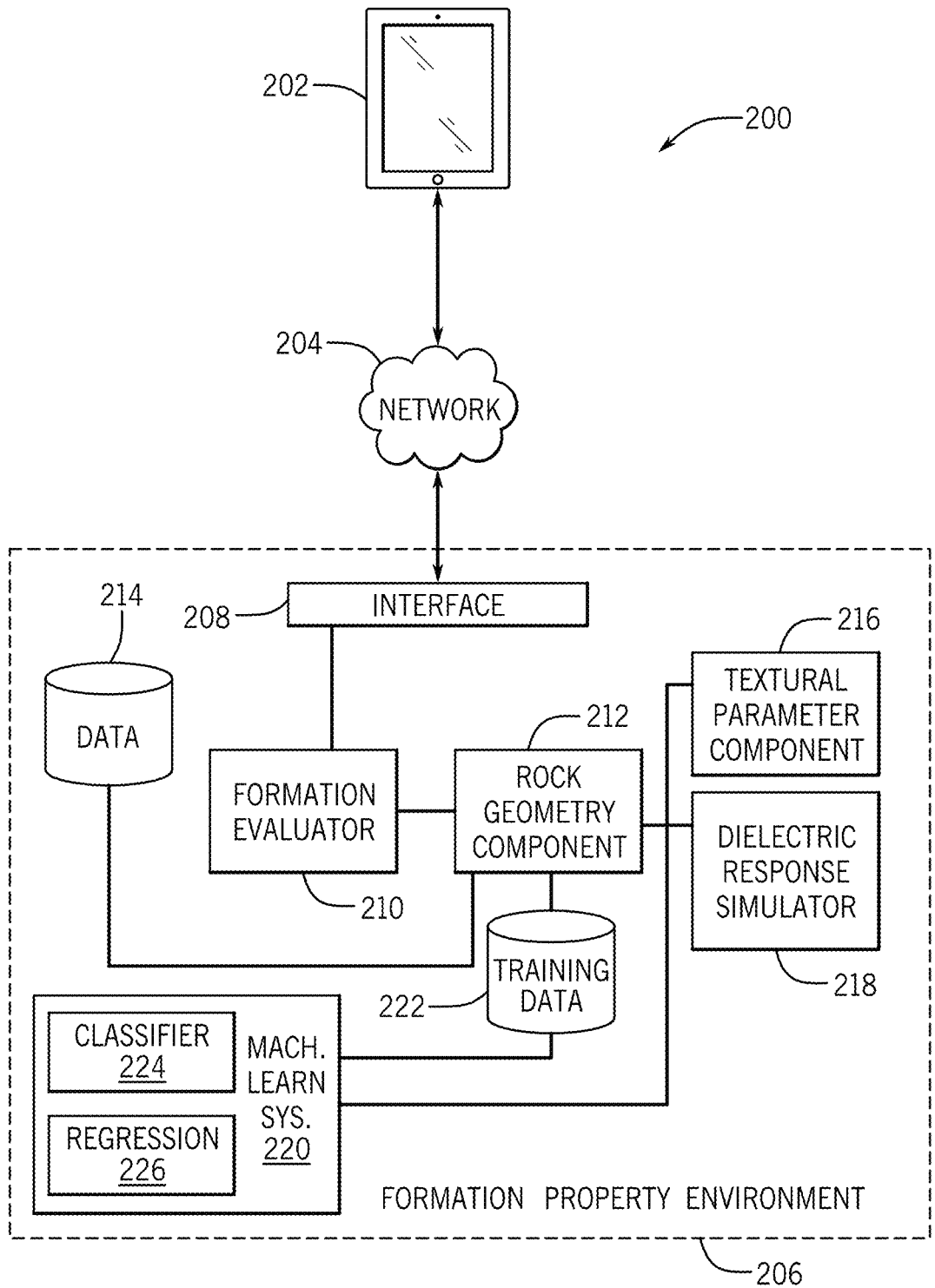
FIG. 2 is a schematic diagram of an embodiment of a formation property environment, in accordance with embodiments of the present disclosure.

FIG. 2 is a schematic diagram of an environment 200 in which various aspects of various embodiments of the present disclosure can be implemented. In this example, a computing device 202 is able to make a call or request across one or more networks 204 to a formation property environment 206 that includes a system that may be utilized to evaluate one or more properties of a wellbore formation. The network (s) can include any appropriate network, such as the Internet, a local area network (LAN), a cellular network, an Ethernet, or other such wired and/or wireless network. The formation property environment 206 can include any appropriate resources for evaluating information from the computing device 202, and may include various servers, data stores, and other such components known or used for providing content from across a network (or from the "cloud"). Individual computing devices 202 may be any of a wide variety of computing devices, including personal computing devices, terminal computing devices, laptop computing devices, tablet computing devices, mobile devices (e.g., smartphones), and various other electronic devices and appliances.

In this example, the computing device 202 may submit wellbore data captured by one or more tools of the BHA 108. For example, the computing device 202 may transmit information from the dielectric measurement unit 112 indicative of permittivity (e.g., a real part of a measurement and an imaginary part that may be expressed in terms of conductivity). Furthermore, in various embodiments, data from the nuclear measurement unit 124 may also be transmitted to the environment 206. The wellbore data may be received at, for example, a network interface layer 208. The network interface layer can include any appropriate elements known or used to receive requests from across a network, such as may include one or more application programming interfaces (APIs) or other such interfaces for receiving such requests. The network interface layer 208 might be owned and operated by the service provider, or leveraged by the service provider as part of a shared resource or "cloud" offering. The network interface layer can receive and analyze the data from the computing device, and cause at least a portion of the information in the data to be directed to an appropriate system or service of the system.

For example, in various embodiments, the data may be transmitted to a formation evaluation module 210. The formation evaluation module 210 may be utilized to determine one or more characteristics or properties of the formation 106 based at least in part on the data provided by the computing device 202. In various embodiments, the formation evaluation module 210 may utilize the data in a transformative or different way to evaluate and/or estimate one or more formation properties. That is, data that may be generally processed using known or approximate formulations may be evaluated differently, or in combination with those formulations, in order to obtain improved results indicative of formation properties. These results may then be used to control or inform one or more physical operations at a well site. For example, an evaluation that determines low permittivity within a rock formation may lead to the use of enhanced recovery techniques or a classification of a wellbore that is unlikely to be productive, and as a result, should be shut in and decommissioned.

The illustrated environment 200 further includes a rock geometry component 212 that may be utilized to generate synthetic rock formations. For example, the rock geometry component 212 may receive information from a data store 214 that includes a plurality of characteristics associated with rock formations, such as rock types (e.g., sandstone, limestone, clay minerals, etc.), grain sizes, porosity, shale content, and the like. Furthermore, geometries of various components may also be stored in the data store 214, for example, based on information obtained from past evaluations of rock formations. In this manner, the rock geometry component 212 may use the information from the data store 214 to generate synthetic rock formations with known characteristics. As will be described below, these synthetic rock formations may be utilized to correlate certain wellbore data, such as permittivity, to other types of wellbore data, such as textural parameters.

The illustrated embodiment further includes a textural parameter component 216 and a dielectric response simulator 218. In various embodiments, the textural parameter component 216 may be utilized, at least in part, to determine textural parameters of the synthetic rock geometries generated by the rock geometry component 212. Additionally, the dielectric response similar 218 may be utilized, at least in part, to determine and/or numerically simulate the dielectric response from the synthetic rock geometries generated by the rock geometry component 212. As will be described below, this information may be used to train a machine learning system 220, which may be used to correlate certain data (e.g., data from the dielectric measurement unit 112) to one or more textural parameters of the formation. In various embodiments, the machine learning system 220 can include a neural network such as a convolutional neural network (CNN).

A neural network is one example of potential machine learning systems 220 which may be utilized with embodiments of the present disclosure. Furthermore, various types of activation functions may be used, such as but not limited to a rectified linear unit (ReLU) model with a nonlinear activation. In some embodiments, neural network models may be linear or nonlinear, and may include a deep learning model or a single hidden layer. Other types of machine learning models may be used, such as decision tree models, associated rule models, neural networks including deep neural networks, inductive learning models, support vector machines, clustering models, regression models, Bayesian networks, genetic models, various other supervise or unsupervised machine learning techniques, among others. The model may include various other types of models, including various deterministic, nondeterministic, and probabilistic models.

For example, convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. Convolutional neural networks exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer.

The illustrated environment includes a training database 222, which may be utilized to provide information to the machine learning system 220. In this manner, the model can be trained to identify certain textural parameters of the formation. For example, the training database 222 may include previously obtained information that correlated core samples with dielectric information. That is, core samples that were extracted from a formation and evaluated, for example in a lab, and then associated along with dielectric information obtained proximate the location where the core samples were removed may be used as information to enable the machine learning system to correlate dielectric information with certain textural properties of the formation. Additionally, the information calculated using the formations from the rock geometry component 212 may further be utilized as training information for the machine learning system 220, for example, after verification against known information.

In various embodiments, the machine learning system 220 may be utilized for classification via a classifier module 224 and for regression via a regression module 226. The classifier module 224 may be trained to identify certain textural parameters of rock geometries. For example, the classifier may determine that a rock geometry has "connected pores" that would facilitate the flow of hydrocarbons out of the formation. Additionally, the classifier may classify formations as "water wet" or "oil wet" based on one or more criteria. In this manner, information about the formation may be determined using less information than traditional methods.

Moreover, in embodiments, the regression module 226 may be used to determine the values utilized in the classifications. For example, the regression module 226 may correlate certain wellbore data to certain textural parameters. In this manner, the machine learning system 220 may receive less information than traditional methods, but still determine which formations have desirable characteristics, which may be used to inform well interventions and the like. For example, in certain embodiments, the machine learning system 220 may be enabled, through use of at least one of the classifier module 224 or the regression module 226, to determine textural parameters of a formation based on the dielectric properties. Additionally, in various embodiments, water saturation may also be determined, although it should be appreciated that water saturation may be considered a textural parameter in certain embodiments. This functionality is vast improved over current methods that utilize expensive and often time-consuming core sample analysis to evaluate formation properties. Moreover, this functionality further improves current techniques in that deep zone properties may be obtained through near-borehole zone measurements.

FIGS. 3A-3D illustrate schematic representations 300A-300D of embodiments of formations having different textural properties. It should be appreciated that the sample representations 300A-300D are for illustrative purposes only and that, in various embodiments, different types of formations may be utilized to generate one or more synthetic rock geometries. As will be described below, in various embodiments different formations may have different textural properties that may be utilized to generate one or more synthetic rock geometries for use in training a network to determine textural properties of formations based on reduced quantities of information.

Figure 3A:
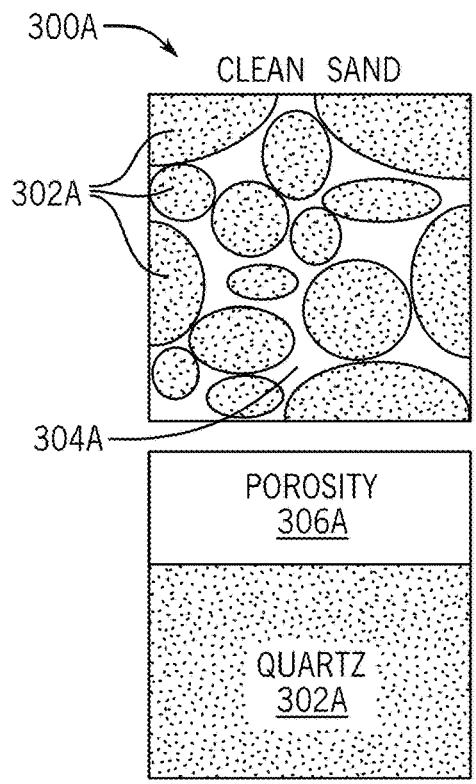
FIGS. 3A-3D are schematic diagrams of embodiments of synthetic rock geometries, in accordance with embodiments of the present disclosure.

FIG. 3A illustrates the representation 300A of clean sand, of which quartz 302A is illustrated as the main material. In the illustrated embodiment, the quartz 302A may form approximately 80 percent of the representation 300A while the remaining 20 percent is represented by voids 304A that correspond to porosity 306A. It should be appreciated that these ranges are for illustrative purposes only and that the ratio of quartz to porosity may be any reasonable value. For example, the formation may be approximately 50 percent quartz, approximately 60 percent quartz, approximately 70 percent quartz, or any other reasonable number with an associated porosity. For clean sandstones, quartz is the main material and the sphericity of the grains is relatively high. As used herein, sphericity refers to the measure of how closely the shape of an object approaches that of a mathematically perfect sphere. In embodiments, the grain size varies between approximately 60 μm and approximately 2 mm, according to the Wentworth scale. Furthermore, the pores (e.g., voids 304A) are generally connected. Therefore, in the geometry illustrated in FIG. 3A, spherical bubbles with various diameters represent quartz grains that are randomly distributed in a fluid host medium (e.g., the area represented within the voids 304A).

Figure 3B:
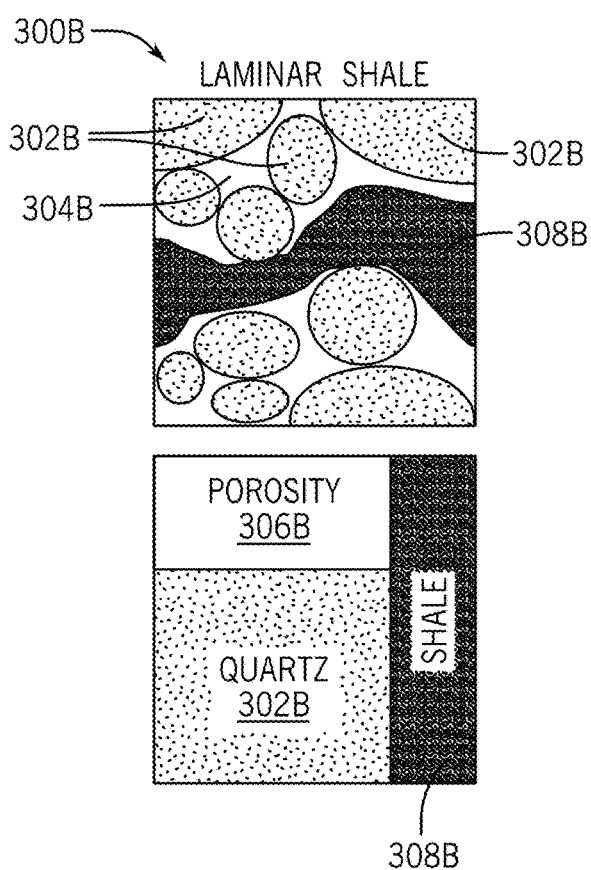
Figure 3C:
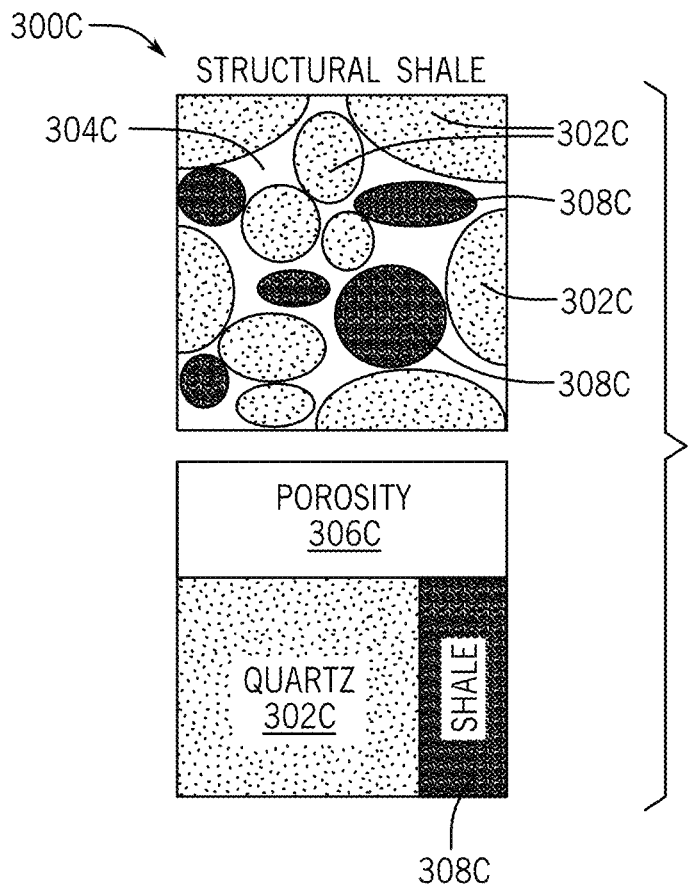
Figure 3D:
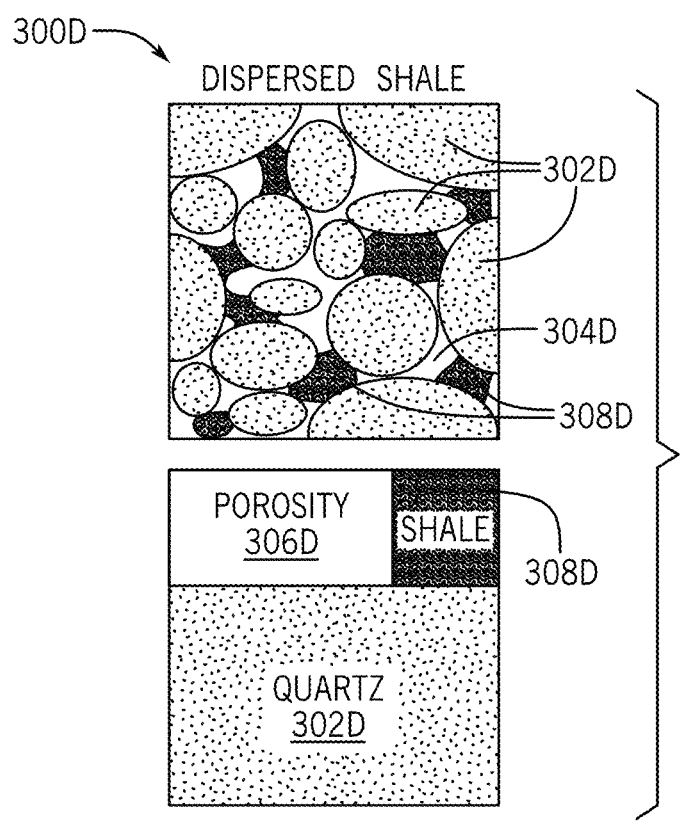

It should be appreciated that grains of clay are much finer than quartz. For example, grain size of clay is less than 2 μm. Clay minerals are fundamentally built of tetrahedral silicate sheets and octahedral hydroxide sheets, and as a result, clay minerals have flatter ellipsoid shapes. At the same time, shale distribution in the formation could be laminar, structural, or dispersed as shown in the FIGS. 3B-3D. Accordingly, geometry of shaly sands can be constructed by adding irregular shaped clays to quartz immersed fluid host, where the clays have conductive surface impedance. FIGS. 3B-3D illustrate laminar shale, structural shale, and dispersed shale, respectively. As described above, the quartz 302B-C is dispersed among the fluid host medium (represented by respective voids 304B-304D). Furthermore, in the embodiments illustrated in FIGS. 3B-3D, shale 308B-D is arranged within the voids 304B-304D. It should be appreciated that a variety of compositions may be utilized when generating the representations 300B-D. For example, the representation 300B illustrated in FIG. 3B is approximately 60 percent quartz, 40 percent porosity, and 20 percent shale. However, the embodiment illustrated by the representation 300C is approximately 60 percent quartz, 30 percent porosity, and 10 percent shale. Accordingly, any reasonable ranges for the quartz, porosity, and shale may be used to represent a variety of different formations.

As described above, in various embodiments textural parameters for rock formations, for example clean sand, may be generated. In certain embodiments, the rock geometry component 212 is utilized to generate synthetic rock geometries based on these parameters. It should be appreciated that realistic geometry of limestone is better obtained through micro-CT due to the large variety of grain size, shape and complicated pore structure. However, such micro-CT may be expensive or time consuming, and as a result, a variety of different compositions may be formed using the rock geometry component 212. FIGS. 4A-4D illustrate representations 400A-D of rock geometries having a variety of different textural properties.

Figure 4A:
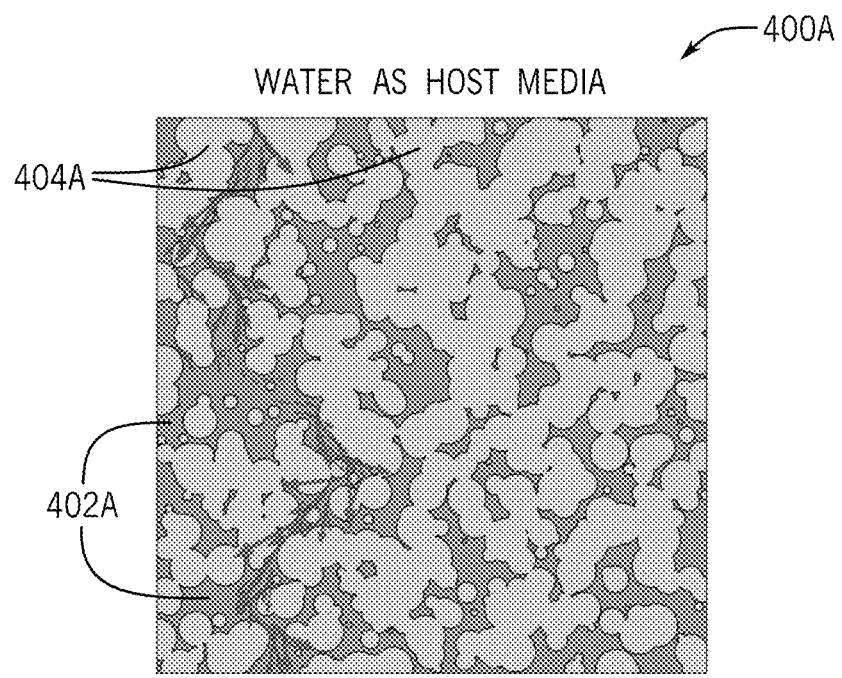
FIGS. 4A-4D are schematic diagrams of embodiments of synthetic rock geometries, in accordance with embodiments of the present disclosure.
Figure 4B:
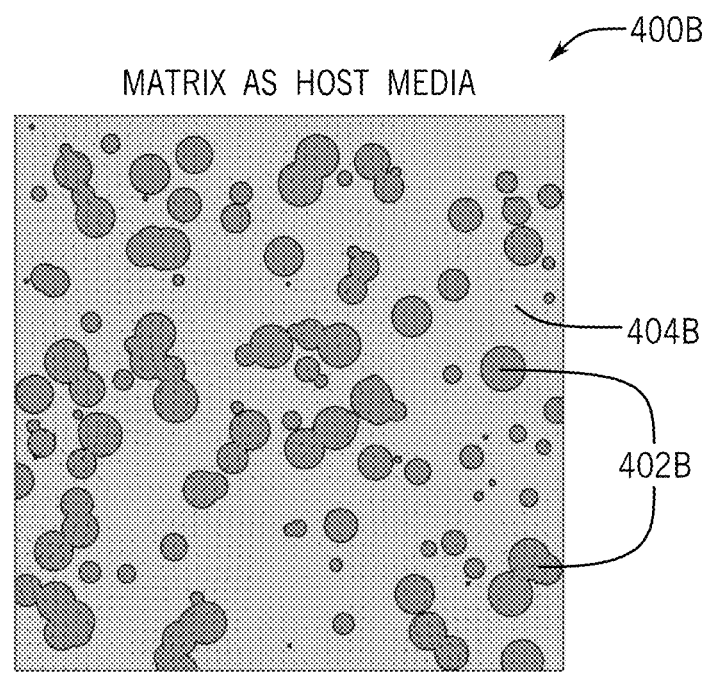

FIGS. 4A and 4B illustrate two-dimensional rock geometries having a porosity of approximately 30 percent. The representation 400A includes water (represented by the voids and/or pores 402) having the grains 404 dispersed throughout. As illustrated, the pores 402 are connected throughout the representation 400A. As a result, it is likely that hydrocarbons positioned within such a formation will be flowable and/or recoverable since the hydrocarbons may freely flow through the pores 402. This type of arrangement is desirable and information indicative of not only porosity, but also the textural property of formation, is important early on recovery processes before producers spend excess amounts of money drilling and working over wells that will likely be non-productive if the porosity is below a threshold amount. For example, the representation 400B illustrates isolated pores 402 within the host media of grains 404. While the formation as a whole may have a porosity of approximately 30 percent, it is apparent that the fluid within the pores 402 is trapped within the media 404 and cannot flow out. Accordingly, a producer may classify this type of formation as non-recoverable or recoverable after certain well intervention methods modify various properties. As a result, knowledge of the textural parameters related to pore connectivity may provide information that enables producers to determine whether or not to continue recovery from certain wells.

Figure 4C:
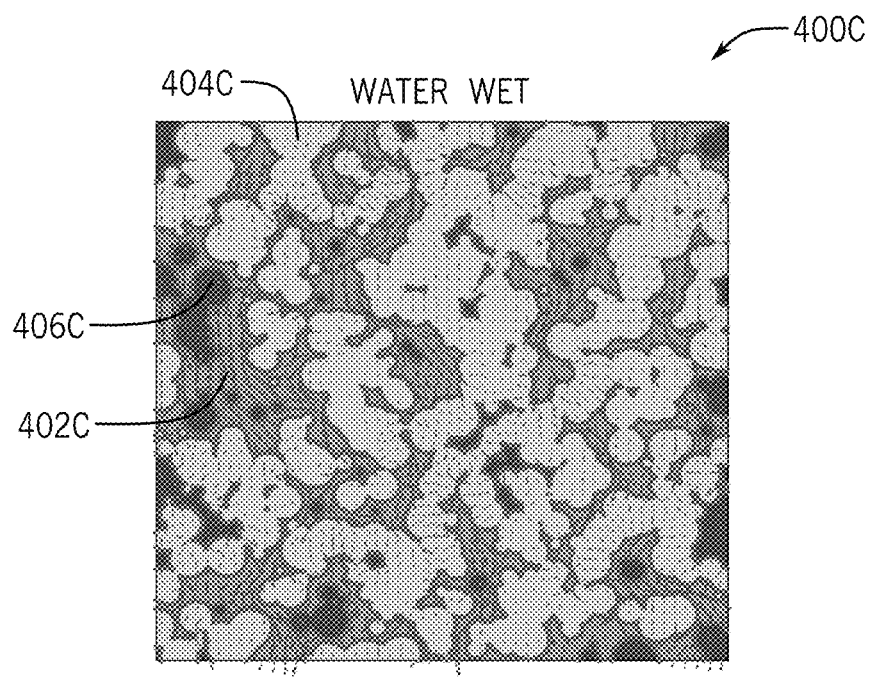
Figure 4D:
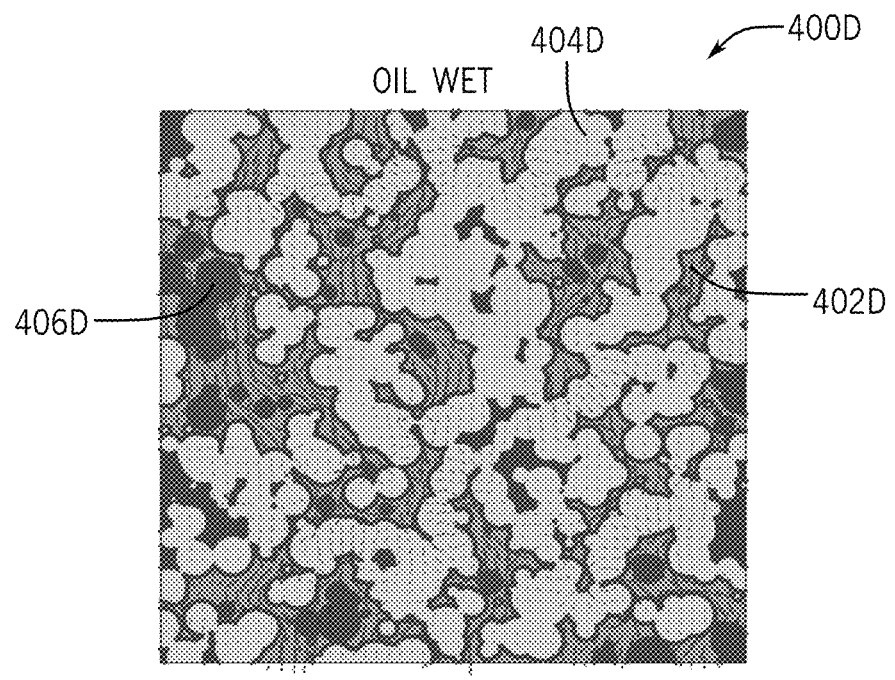

FIGS. 4C and 4D illustrate two-dimensional geometries of the representations 400C and 400D indicative of water wet and oil wet scenarios, respectively. That is, the rock geometry illustrated in FIG. 4C may be termed water wet while the rock geometry illustrated in FIG. 4D is oil wet. This may be termed "wettability" and is the tendency of one fluid to spread on or adhere to a solid surface in the presence of other immiscible fluid. More specifically, wettability is the tendency of a reservoir rock surface to preferentially contact a particular fluid in a multiphase or two-phase fluid system. Wettability may have an impact on reservoir characteristics, such as permeability, capillary pressure, and the like. As will be appreciated, certain treatments may be performed that change formations from water-wet to oil-wet, which can impair productivity. Accordingly, knowledge of formation wettability may be desirable when determining subsequent recovery or intervention steps. Such information may be modeled into the synthetic rock geometries produced by the rock geometry component 212 to evaluate how different measureable characteristics may be correlated to wettability.

In the illustrated representations 400C and 400D, the pores 402C and 402D are arranged between the grains 404C and 404D and further include hydrocarbons 406C and 406D. As illustrated in the water-wet scenario of FIG. 4C, flow through the formation is greatly improved as compared to the flow in the oil-wet scenario of FIG. 4D.

Figure 5:
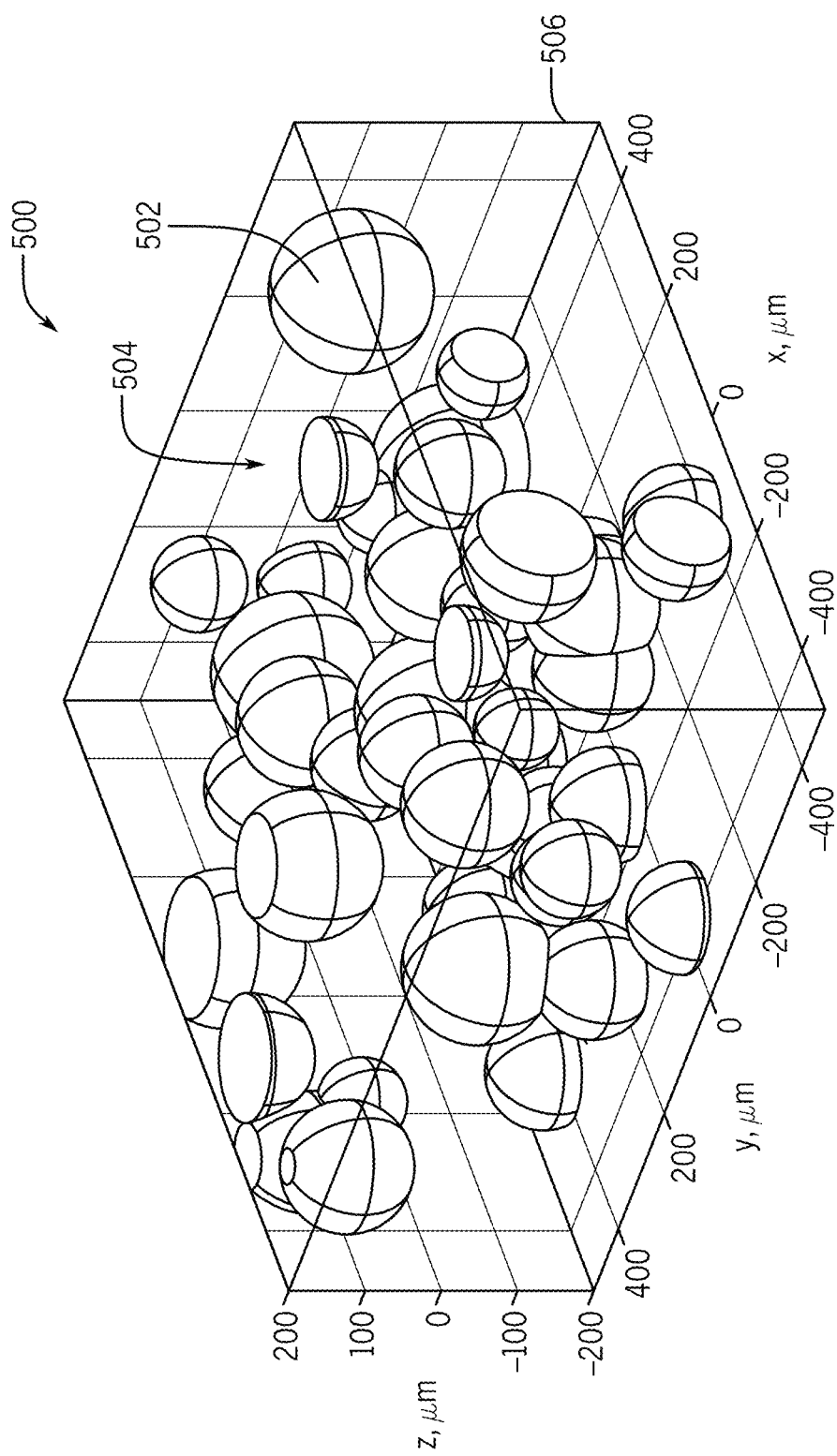
FIG. 5 is a perspective view of an embodiment of a synthetic rock geometry, in accordance with embodiments of the present disclosure.

FIG. 5 illustrates a three-dimensional representation 500 of a synthetic rock geometry including approximately 50-grain particles 502 placed in water 504. As illustrated, the particles 502 may be substantially randomly distributed through a volume 506 to represent a variety of different configurations that may be present within a downhole formation. As will be described below, the representation 500, and others like it, may be utilized in order to compute various textural parameters from the known geometries. Furthermore, numerical simulations of dielectric responses may be determined from the geometries in order to provide data to a machine learning system for verification against known, measured formations. As a result, the above-described regression module and classifier module may be utilized to determine textural parameters of formation properties based on less information than traditional methods and to also classify certain features of the formation to inform subsequent physical actions.

As described above, in various embodiments, data acquired from dielectric measurements may be related to permittivity of the formation. Frequency dependences of formation permittivity and conductivity can be observed from log and core data. For a porous rock with a mixture of grain types and saturated with fluids, the main drivers of the dispersive behavior are the strong polarized water molecular structure, the interfacial polarization of free charges in the pore space, and the ionic polarization due to thin layer coating of bounded fluids.

Free distilled water has permittivity around 80, which is much higher than rock or hydrocarbon, over the normal operating frequency ranges of most downhole electromagnetic (EM) tools. The structure of a water molecule, with two hydrogen atoms at one side and an oxygen atom on the other, is highly polarized. When alternating current is applied, water molecules will rotate to align to the electric field.

Free ions and cations in pore fluids contribute significantly to the dispersion from several aspects. First, the total number of ions is related to fluid salinity, higher salinity causes higher formation water conductivity, thus affecting the overall complex formation permittivity. However, water molecules become weakly bounded towards the ions and their rotation flexibility is hindered, which leads to decrease of formation water permittivity. In addition, free charges can accumulate along the pore wall and form polarization planes with existence of electromagnetic field. This is the so-called "Maxwell Wagner Effect." For porous rocks, it manifests as an increase in permittivity and decrease in conductivity as frequency decreases to the MHz range. The Maxwell Wagner Effect is also influenced by the shape and connectivity of pores; like capacitors, thin pathways and large surface areas generate higher permittivity.

For grains coated with thin layer of oil in the case of oil-wet rocks, it acts like a thin insulator with charges on both sides. Similar stern layers exist when water clings to inter-surface layers of swelling clay sheets. A dominating dielectric enhancement can be produced in these scenarios for lower frequencies in the KHz range. In summary, dielectric dispersion is an interwoven result of water content, salinity, pore structure, wettability, matrix type and clay content. Thus, a comprehensive dielectric model should be able to consider these factors and quantify their influences, however, current systems are limited in that they use empirical models or simplified macroscopic mathematic models that neglect to consider physical texture of the formation or interaction between the matrix and various fluids over a wide frequency range. For example, as described above with respect to FIGS. 4A and 4B, merely determining the porosity does not provide any information as to recoverability of a formation when the connectivity of the pores is unknown.

Complex refractive index mixing (CRIM) is the most known mixing law for effective permittivity computation of mixtures. It is based on power law and expresses dielectric properties of a mixture in terms of the volumes of different formation components. However, this simplicity in calculation comes at a price because certain textural parameters cannot be determined using CRIM. Furthermore, CRIM has difficulties at low frequencies, and as a result, Maxwell Wagner is typically implemented. For lower frequencies, Maxwell Wagner effects became unlikely to be explained by purely volumetric parameters. Effective medium theories are used to calculate the dielectric response of a material with inclusions placed in a host medium.

For the effective medium theory to be valid, inclusions in the host medium should be sparsely distributed and less than about 30 percent of the total volume. This causes ambiguity in porous rock modeling where the total volume of pores is usually less than matrix grains but pore space is connected. Since effective medium is not symmetric, models with different assumptions on the host medium and inclusions give different permittivity predictions.

Due to the conductive surface of clay, high dielectric enhancement in shaly formation has been observed in both laboratory measurements and resistivity logs. Dual water model is one of the most well-known true formation resistivity models to take CEC effect of shale into consideration.

Prior methods face numerous disadvantages, including trading off a complicated description of the microscopic pore structure topography for mathematical simplicity. As a result, pore size or shape distribution cannot be obtained from those methods. Furthermore, they fail to represent complex permittivity directly with petrophysical parameters such as CEC, cementation exponent and wettability. Additionally, they are tested over experimental data without cross-validation, hence for different types of formations, researchers faces challenges of deciding which is the most suitable one. Embodiments of the present disclosure overcome these difficulties and illustrate an improvement over the prior methods where desirable petrophysical parameters can be determined from dielectric data. Furthermore, embodiments of the present disclosure also improve computing technology by developing systems for machine learning and correlating various pieces of information. This machine learning can be done prior to analysis to thereby provide a response to a request with faster results, thereby improving a user experience. Furthermore, embodiments of the present disclosure illustrate simulation of a variety of different types of rock geometries with different properties, which enables a more flexible approach as various types of formations may be presented for evaluation. Moreover, the synthetic rock geometries may be validated against known rock geometries, thereby improving the generation of the synthetic rock geometries and further providing improved results for new formations.

Figure 6:
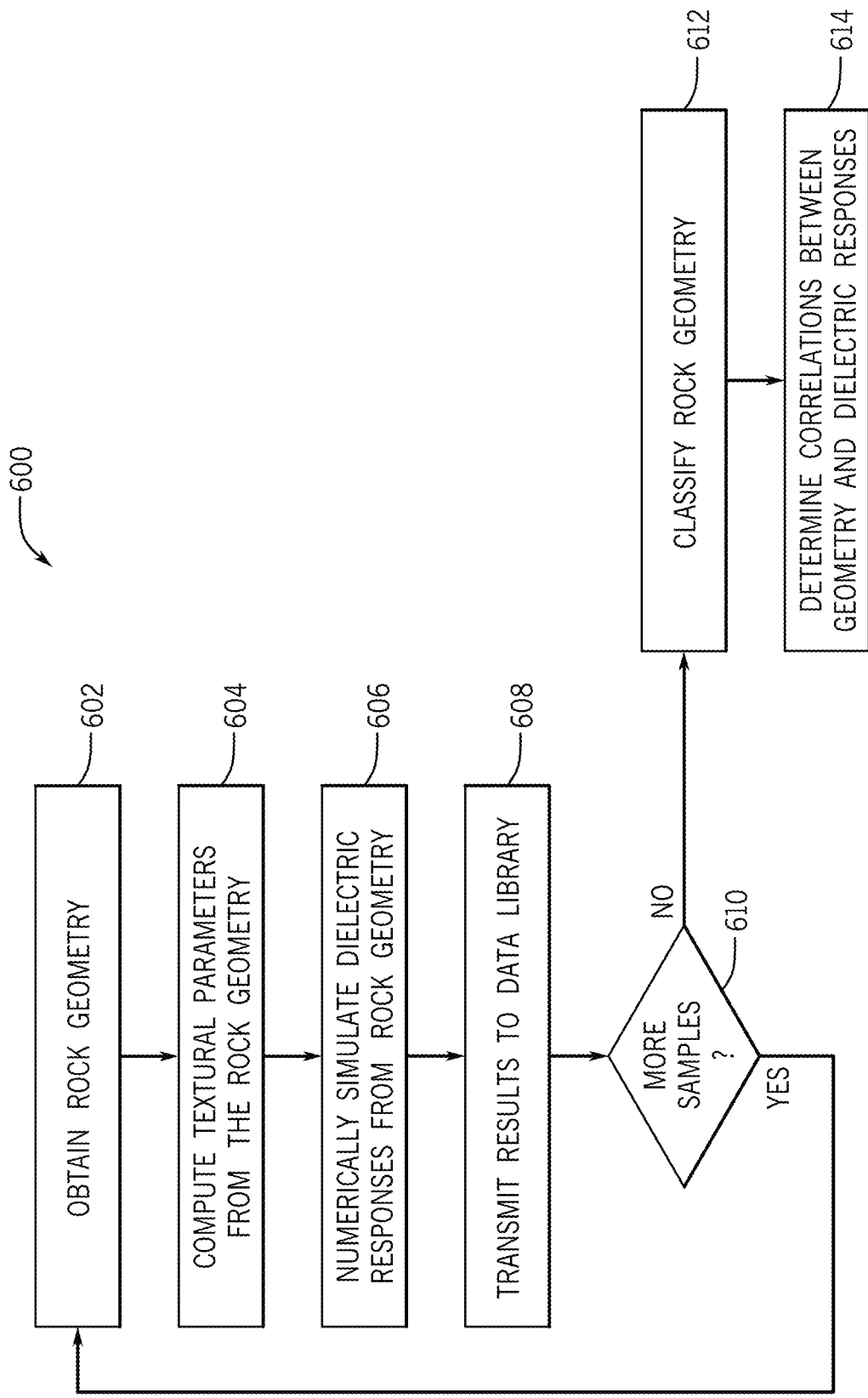
FIG. 6 is a flow chart of an embodiment of a method for evaluating synthetic rock geometry, in accordance with embodiments of the present disclosure.

FIG. 6 is a flow chart of an embodiment of a method 600 for determining one or more parameters of a synthetic rock geometry. It should be appreciated that for this method and all methods described herein that various steps may be added or omitted. Moreover, the steps may be performed in any order or in parallel, unless otherwise explicitly stated. In the illustrated embodiment, rock geometry data is obtained (block 602). For example, the rock geometry data may be synthetic rock geometry data. The rock geometry may be used to compute textural parameters (block 604) and to numerically simulate dielectric responses (block 606). For example, in various embodiments, finite element models may be used to solve microscopic rock structures.

For example, in embodiments where the rock geometry is a synthetic rock geometry, a parallel plate structure with PEC (perfect electrical conductor) top and bottom planes sandwiching a composite may be used in the modeling. A harmonically oscillating potential voltage is applied on a top plane and a bottom is connected to ground. The composite between the two plates is a porous rock structure with mixture of grains and fluids. Geometry of the microscopic structure may be generated as the synthetic rock geometry. Electrical properties of each component in the mixture are assigned according to assumptions of the model. For example, water has high permittivity and its conductivity is determined by salinity while quartz grains and oil are non-conductive with relatively low permittivity. Using FEM method in frequency domain, effective bulk permittivity and conductivity are computed.

Additionally, in various embodiments, volumetric factors including water and hydrocarbon contents, as well as textural features of the rock such as grain size distribution and sphericity distribution can be deduced from the pore-scale geometry. Meanwhile, dispersion of permittivity and conductivity may be obtained through a frequency sweep of the FEM computation. In addition, cementation exponent m and wettability n, the same parameters in Archie's equation (Equation 1), can be found via Equations 2 and 3.

$$R_t = \frac{R_w}{\emptyset^m \times S_w^n} \quad (1)$$

For instance the HC content (volumetric percentage of hydrocarbons in the whole spore space, i.e., $1-S_w$) in the original geometry is replaced with formation water and a DC response of bulk resistivity $R_o$ is computed. Then m follows:

$$m = \frac{\log(R_w) - \log(R_o)}{\log(\emptyset)}. \quad (2)$$

Similarly, n is $$n = \frac{\log(R_w) - \log(R_t) - m\log(\emptyset)}{\log(S_w)} \quad (3)$$

where $R_t$ is extrapolated DC resistivity from computed conductivity dispersion of the original geometry. Furthermore, in embodiments, textural parameters may also include water saturation, which as used herein, refers to the fraction of water in a given pore space. Water saturation may be related to porosity, as will be described below. The calculated properties may be transmitted to a data library (block 608), where the information may be saved for later use, such as for training a machine learning system. If additional samples remain (operator 610), further calculations may be conducted to further increase the data for training the machine learning system. If not, the rock geometry may be classified (block 612).

In embodiments, features are identified as petrophysical parameters including water-filled porosity, water salinity, cementation exponent m, wettability n, grain size distribution, grain sphericity distribution, and the like. Targeting variables are dielectric and conductivity spectrum. For example, in various embodiments, classification may include feature selection that utilizes SVM approach to evaluate orthogonality and importance coefficient of model features. The approach may further select the minimal number of orthogonal features by recursively considering smaller and smaller sets of features. Thereafter, grid search method using a list of hyper-parameters may be utilized to classify the rock geometries in various predetermined categories. In embodiments, the classification may evaluate various types of classifiers to distinguish sandstone, limestone, or shaly sand samples.

In various embodiments, regression may also be utilized (block 614) in order to correlate certain features to various dielectric measurements. Rock petrophysical parameters like m, n and water saturation ($S_w$) can be inverted from dispersive permittivity and conductivity spectra. However, conventional petrophysical models lack generality to be applied to different mineralogy and rely on simplification and assumptions on rock structure. A data driven approach described herein that uses multi-output regressors enables direct solution of textural parameters from EM responses. For example, as described above, textural parameters of rocks like m and $S_w$ are correlated. Hence, regressor stacking, regressor chain, and multi-output Least-Square-Supported-Vector-Regressor (LS-SVR) may be utilized with embodiments of the present disclosure. In various embodiments, different models for a variety of scenarios may be evaluated through grid search of hyper-parameters. Accordingly, various features for the synthetic rock geometries may be determined and processed for use with a machine learning system.

Figure 7A:
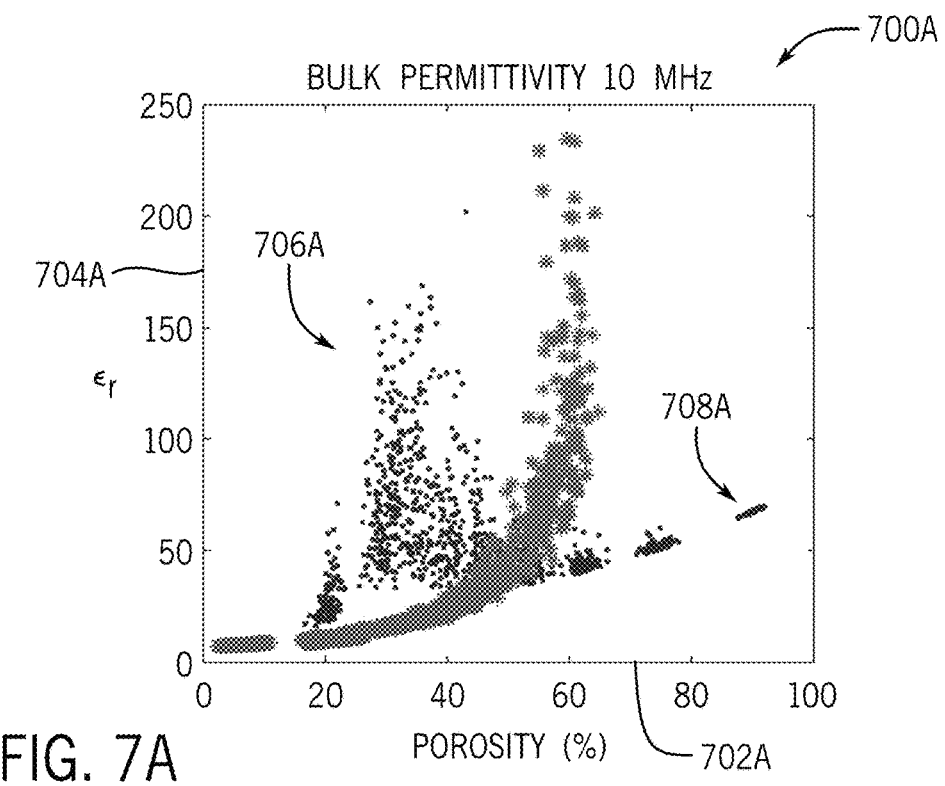
FIGS. 7A-7G are graphical representations of embodiments of correlations between textural parameters and dielectric properties, in accordance with embodiments of the present disclosure.
Figure 7B:
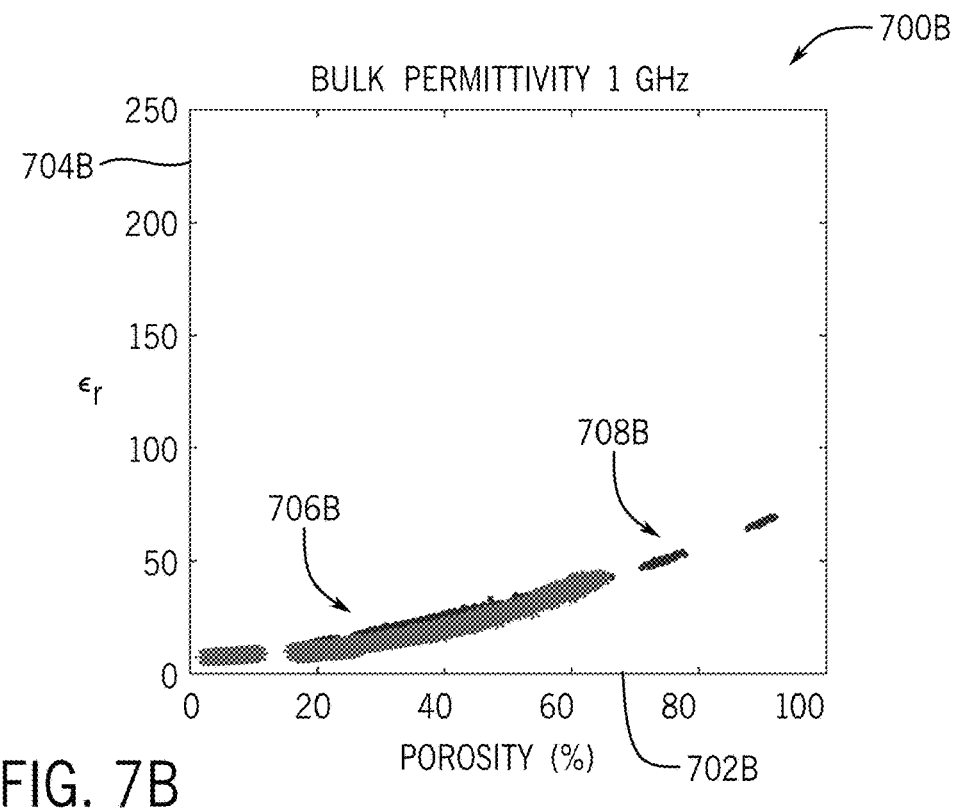

FIGS. 7A-7G are graphical representations of correspondence between certain textural parameters and porosity. For example, FIGS. 7A and 7B includes graphical representations 700A, 700B where the x-axis 702A, 702B corresponds to porosity and the y-axis 704A, 704B correspond to permittivity. A first permittivity response 706A corresponds to geometries having water as host medium (e.g., geometries like FIG. 4A) while a second permittivity response 708A corresponds to geometries having isolated pore structures (e.g., geometries like FIG. 4B). As illustrated in FIG. 7A, when the frequency is low (e.g., 10 MHz), there is divergence between the first and second permittivity responses 706A, 708A. In contrast, FIG. 7B illustrates that at higher frequencies (e.g., 1 GHz), the first permittivity response 706B substantially aligns with the second response 708B. As a result, embodiments of the present disclosure may utilize high frequency permittivity responses in order to correlate data between permittivity and porosity.

Figure 7C:
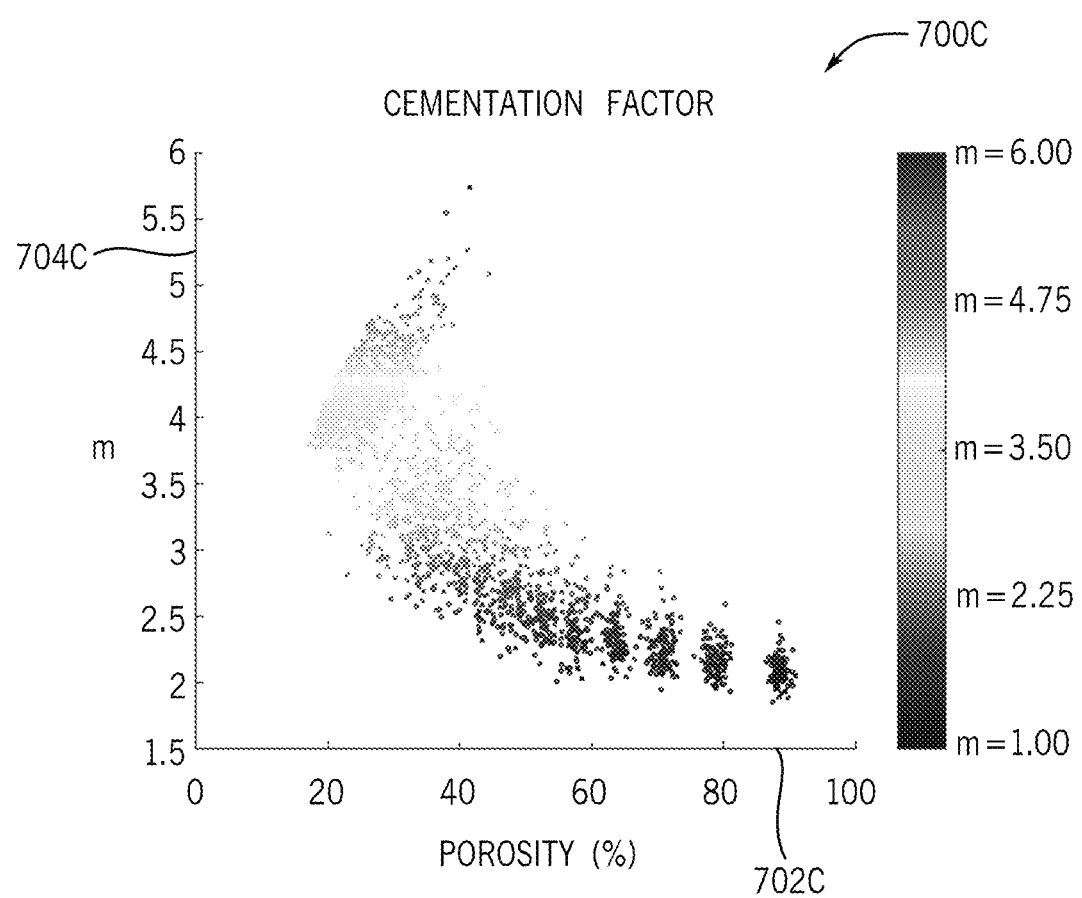
Figure 7D:
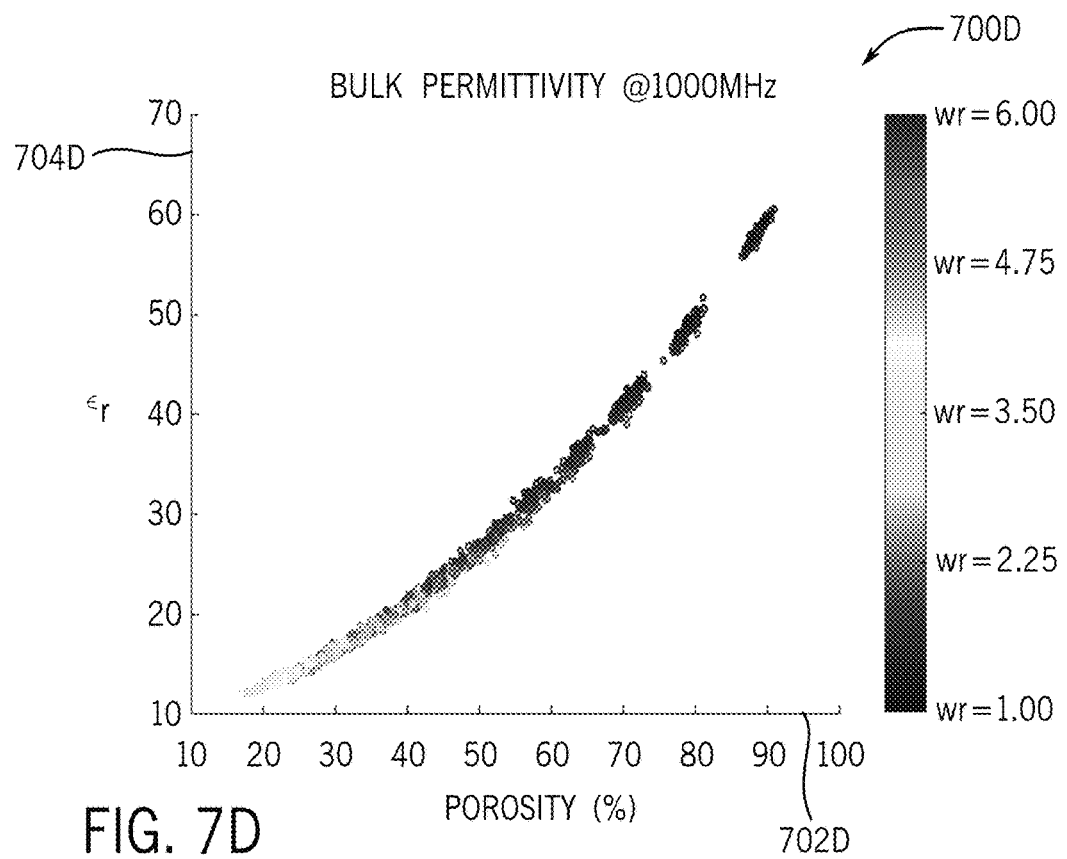

The representation 700C illustrated in FIG. 7C illustrates a correlation between a cementation factor and porosity. The y-axis 704C corresponds to cementation factor m and the x-axis 702C corresponds to porosity. As illustrated, there is a correlation between the cementation factor and water-filled-porosity.

Figure 7E:
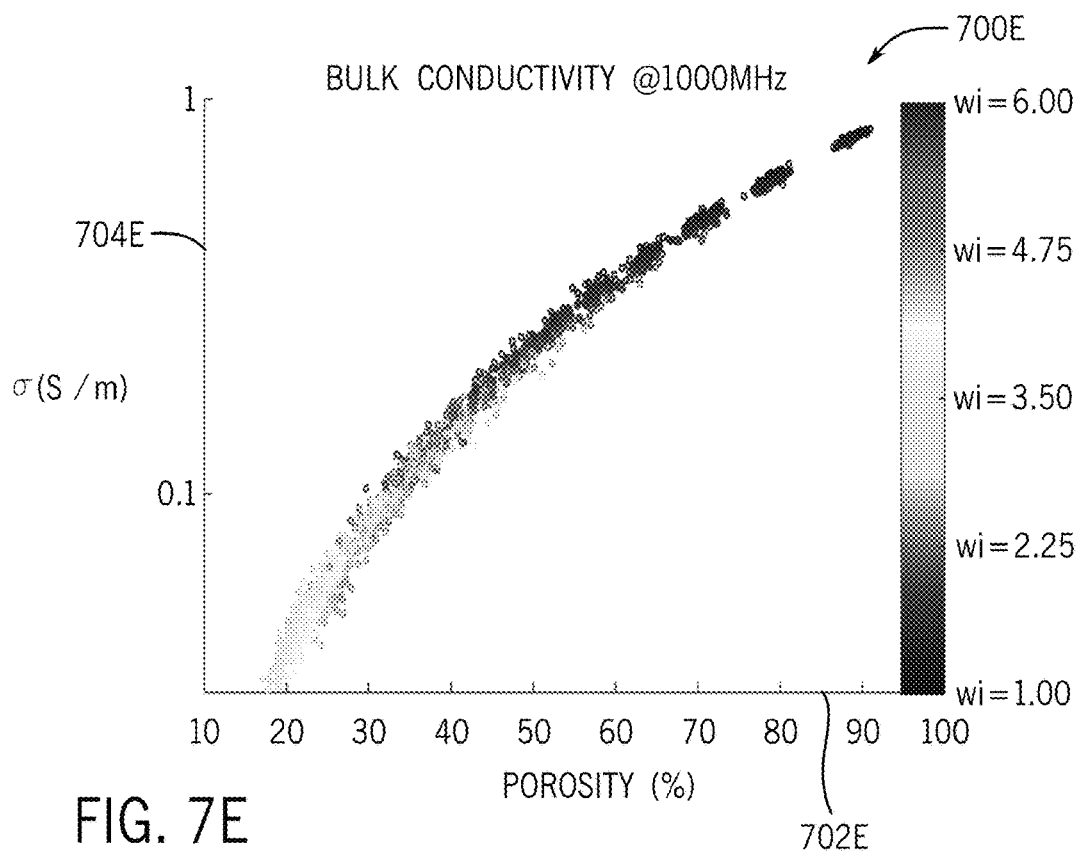

FIGS. 7D-7G illustrate graphical representations 700D-700G of bulk permittivity and conductivity relationships to porosity at different frequencies. In the embodiment illustrated in FIG. 7D, the x-axis 702D corresponds to porosity and the y-axis 704D corresponds to permittivity. As illustrated, the permittivity substantially corresponds to the porosity, as represented by the permittivity response 706D. FIG. 7E illustrates the graphical representation 700E with the x-axis 702E corresponding to porosity and the y-axis 704E corresponding to conductivity. Once again, there is a correlation as a larger conductivity is associated with greater porosity. The illustrated embodiments are taken at approximately 1000 MHz.

Figure 7F:
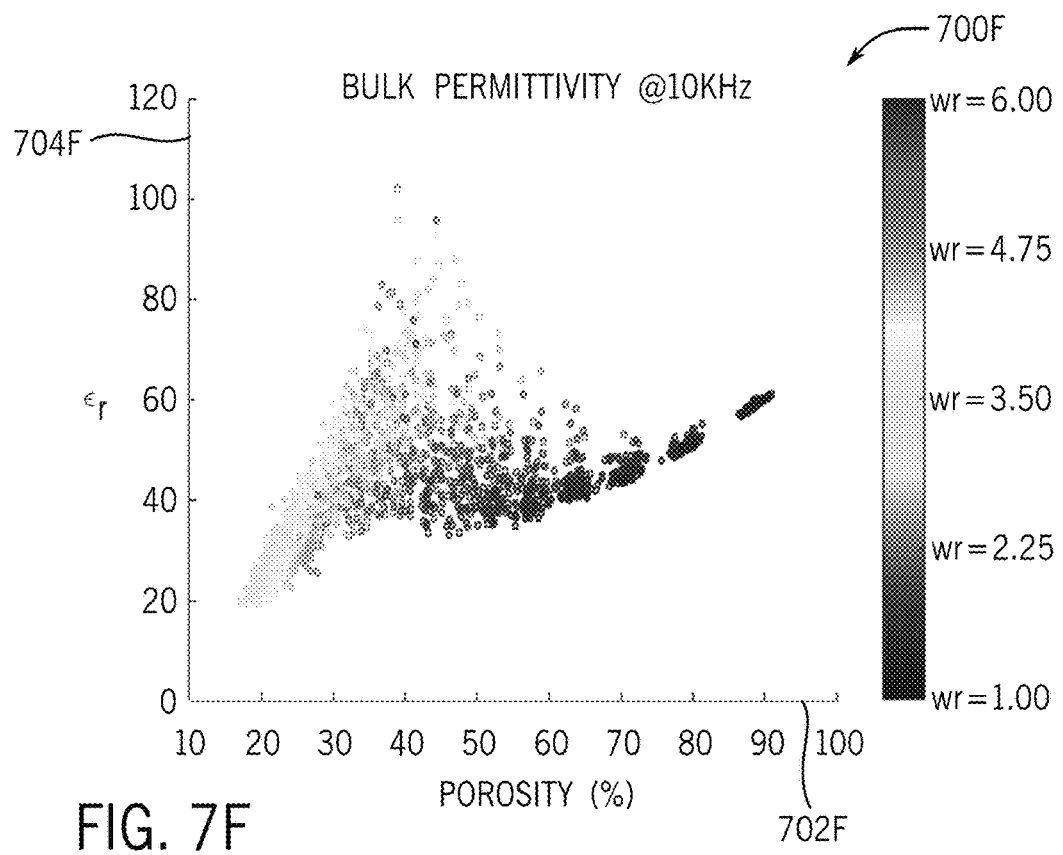
Figure 7G:
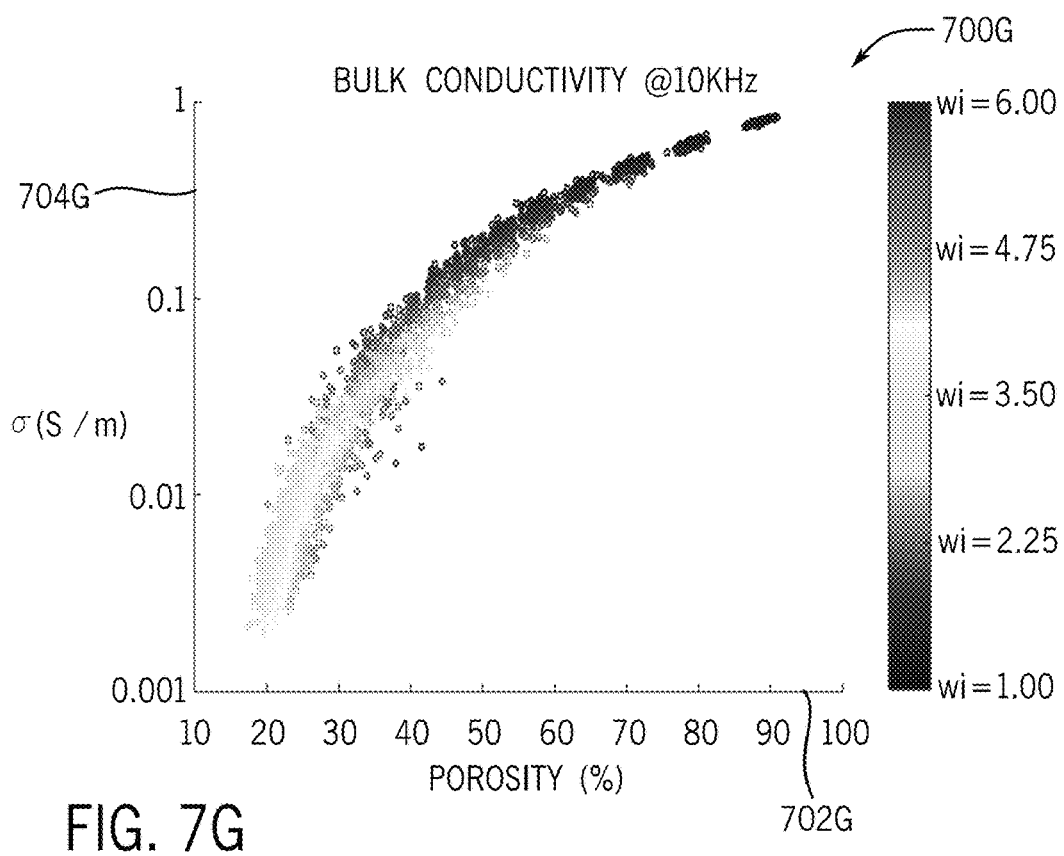

FIGS. 7F and 7G also correspond to permittivity and conductivity, respectively, but are taken at approximately 10 KHz. As illustrated, there is not as clear a correspondence with the permittivity in representation 700F as in the representation 700D. Furthermore, while representation 700G illustrates some relationship between the conductivity and the porosity at 10 KHz, it is not as pronounced as the representation 700E. As will be described below, this association with frequency response may be utilized to determine water saturation and/or other textural parameters based on dielectric data.

Figure 8:
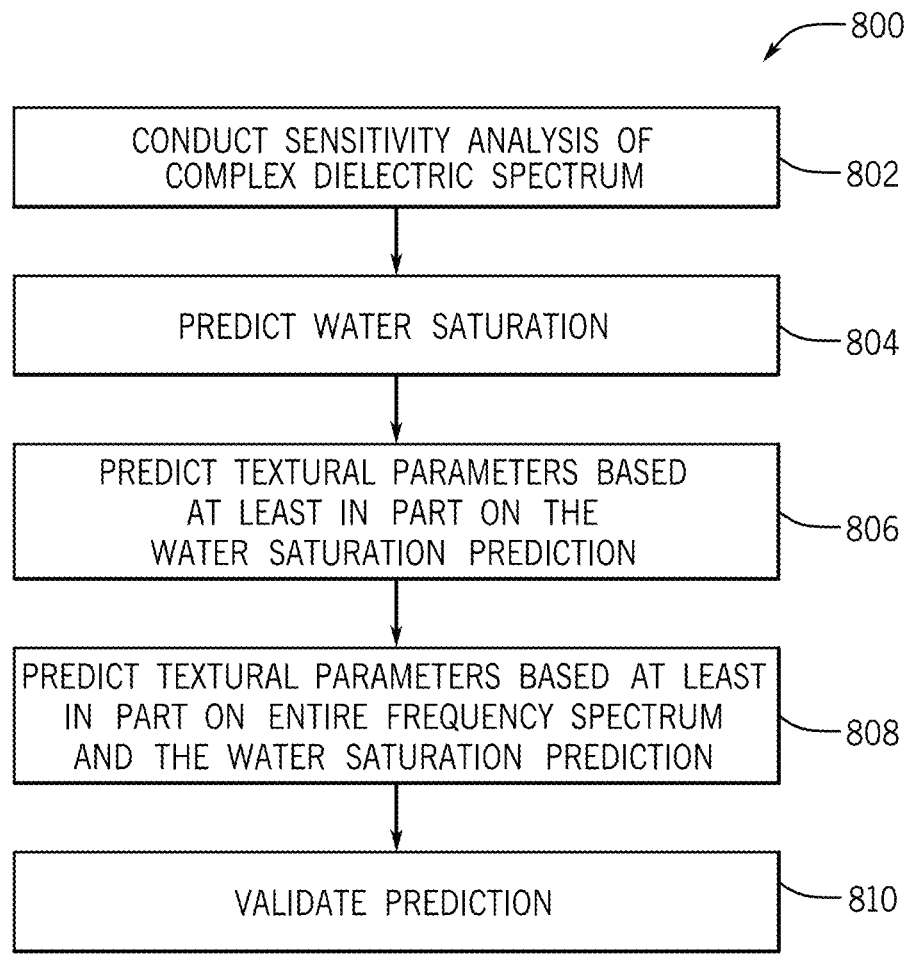
FIG. 8 is a flow chart of an embodiment of a method for predicting a textural parameter based on water saturation, in accordance with embodiments of the present disclosure.

FIG. 8 is a flow chart of an embodiment of a method 800 for predicting textural parameters of a formation. In various embodiments, sensitivity analysis of a complex dielectric spectrum is performed (block 802). The sensitivity analysis, in various embodiments, may be performed with respect to water saturation and one or more textural parameters. As used herein, sensitivity analysis refers to an analysis of how different values of a set of independent variables may impact other variables. For example, as described above with respect to FIGS. 7A-7G, sensitivity analysis may be used to determine a relationship between certain dielectric properties and porosity. It should be appreciated that a variety of different methods or processes may be used to conduct the sensitivity analysis, such ash One-at-a-time, Local methods, Scatter plots, Regression analysis, Variance-based models, Variogram-based Models, Screening, and the like.

In certain embodiments, frequency may be relevant in determining how certain dielectric properties correspond to textural parameters, such as porosity. As a result, in various embodiments, water saturation may be predicted (block 804), for example, by evaluating a frequency response and utilizing the highest frequency, as illustrated with respect to FIG. 7. Thereafter, the predicted water saturation may be used, at least in part, to predict one or more other textural parameters (block 806). For example, the water saturation may be utilized to determine features such as the cementation factor. Furthermore, in various embodiments, the predicted water saturation may be used over a range of frequencies to predict textural parameters (block 808). For example, the predicted water saturation may be based on one or more correlations between features, and as a result, may simplify other predictions when evaluating different dielectric properties and/or different frequencies. In various embodiments, large differences between how predicted textural parameters at high frequencies and low frequencies may be discarded, for example, based on a threshold difference. Furthermore, in various embodiments, the prediction of the textural parameters may be validated (block 810), for example, with known data from a data base used as a ground truth in a machine learning system.

Figure 9:
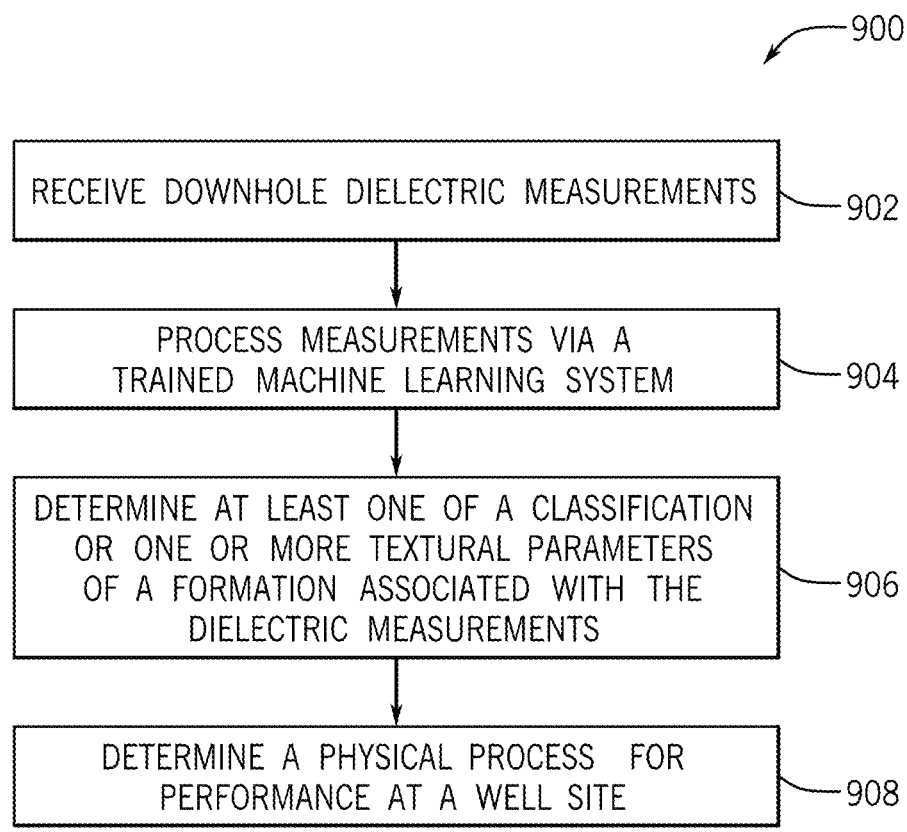
FIG. 9 is a flow chart of an embodiment of a method for determining a classification, in accordance with embodiments of the present disclosure.

FIG. 9 is a flow chart of an embodiment of a method 900 for classifying formations. In various embodiments downhole dielectric measurements are received (block 902), for example via an interface associated with a data processing service. In embodiments, the service may be provided by a wellbore services provider or, in various embodiments, as a standalone package or Software as a Service (SaaS) offering. The data may be processed using a trained machine learning system (block 904). For example, the system may be trained to perform a variety of classifications and determinations of the data (block 906). In various embodiments, the dielectric information may be utilized to classifying certain wellbore properties (e.g., pore connectivity, wettability, etc.). Furthermore, in various embodiments, one or more regressors may output textural parameters associated with the data. It should be appreciated that assignment of a classification may be based, at least in part, on determining whether one or more evaluated properties are within a threshold amount of a classifying property. Thereafter, one or more physical processes performed at a well site may be determined (block 908). For example, a classification of low pore connectivity may result in wellbore abandonment. Moreover, a classification that a formation is water-wet may inform how wellbore interventions are performed in order to not change the formation to an oil-wet formation. In this manner, dielectric data may be utilized to determine classifications and/or textural parameters that may inform physical operations at the well site.

FIG. 10 is a flow chart of an embodiment of a method 1000 for training a machine learning system using a combination of synthetically generated data and known data. In this example, synthetic rock geometries are generated (block 1002). For example, as described above, rock geometries may be generated based on known formation properties or ranges. From the synthetic rock geometries, dielectric responses (block 1004) and textural parameters (block 806) may be computed. In various embodiments, one or more of the dielectric responses or textural parameters computed by the system may be validated (operator 1008), for example, against known values. If the values cannot be validated, then the process ends (block 1010). Validation may include comparing the values against known parameters and determining whether the values are within a threshold of the known parameters. Values within the threshold may be validated while values outside of the threshold may not.

In addition or in parallel, known rock geometry samples may be obtained (block 1012), for example, from a data library that stores previously obtained and/or calculated information for rock formations. From this data library, known dielectric responses (block 1014) and textural parameters (block 1016) may be obtained. The collected and/or calculated information may be stored (block 1018), for example in a training database for use with training a machine learning system for classification and/or regression. In various embodiments, the information is used to determine classification associations (block 1020), as described above. Furthermore, in embodiments, the information may be used to determine textural parameters associations (block 1022). As a result, parameters for evaluating new data may be established. The system may determine if new data has been made available (operator 1024). If so, the new data may be evaluated based on the type of data (e.g., newly generated synthetic data or new known data from other wellbore operations). If no, the process may end (block 1026). In this manner, the machine learning system may be trained with a combination of data types and may be continuously updated as new information becomes available.

In various embodiments, various instrumentation units and data collection units may be utilized that may include a digital and/or an analog system. Furthermore, various surface and wellbore components not illustrated for clarity may also use a variety of digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the systems and methods disclosed herein. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit) may be included in support of the various aspects discussed herein or in support of other functions beyond this disclosure The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for conducting measurement operations, the system comprising:
   a dielectric measurement device forming at least a portion of a downhole tool string, the dielectric measurement device operable to generate measurement data for detecting a dielectric property of a downhole formation;
   a microprocessor; and
   memory including instructions that, when executed by the microprocessor, cause the system to:
   receive the measurement data;
   generate a synthetic rock geometry representing a particle distribution within a volume of the synthetic rock geometry of the downhole formation;
   compute a textural parameter of the synthetic rock geometry;
   simulate a response of complex dielectric spectrum of the synthetic rock geometry to form a simulated dielectric response;
   train a machine learning system using the computed textural parameter and the simulated dielectric response to form a trained machine learning system;
   process the measurement data, via the trained machine learning system;
   determine a classification of the downhole formation, via the trained machine learning system, the classification of the downhole formation being related to a likelihood of recoverability of hydrocarbons from the downhole formation based on one or more textural properties of the formation and a water saturation; and
   assign the classification of the downhole formation to the downhole formation.

2. The system of claim 1, wherein the memory includes instructions that, when executed by the microprocessor, further cause the system to:
   receive a plurality of rock geometries; receive a plurality of known measurement data corresponding to dielectric properties of respective rock geometries of the plurality of rock geometries; and
   train the machine learning system using the plurality of rock geometries and the plurality of known measurement data.

3. The system of claim 1, wherein the memory includes instructions that, when executed by the microprocessor, further cause the system to:
   determine a physical operation, to be performed at a well site, based at least in part on the classification of the downhole formation.

4. The system of claim 1, wherein the measurement data does not include a core sample.

* * * * *